C. J. CARR.
Horseshoe.
No. 8,932. Reissued Oct. 14, 1879.
Fig. 1.
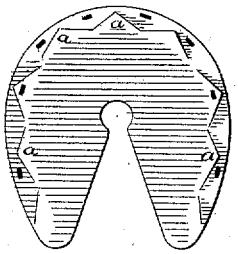
Fig. 2.
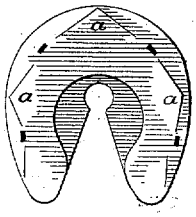
Fig. 3.
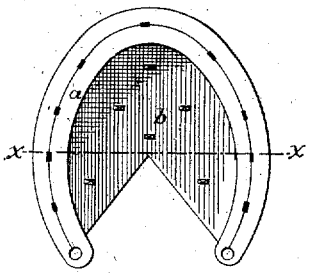
Fig. 4
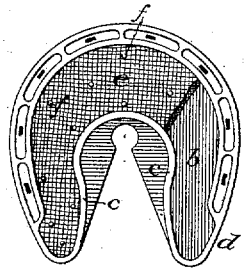
Fig. 3.a
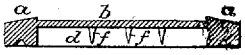
Fig. 7.
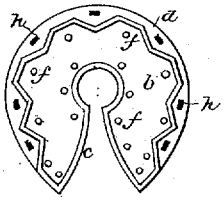
Fig. 8.
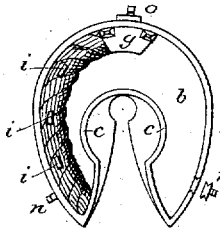
Fig. 6.
Fig. 5.
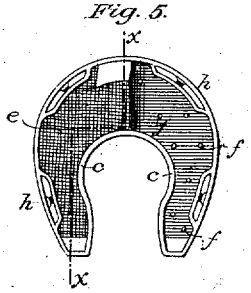
Fig. 5.a
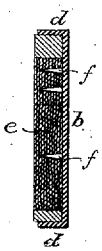
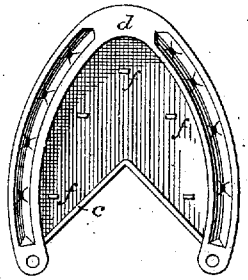
Attest:
C. Clarence Poole
Warren Seely
Inventor:
Charles John Carr,
by Elei Spear
Atty
THE NORRIS PETERS CO., PHOTO-LITHO., WASHINGTON, D. C.

UNITED STATES PATENT OFFICE.

CHARLES JOHN CARR, OF MATLOCK GREEN, COUNTY OF DERBY, GREAT BRITAIN.

IMPROVEMENT IN HORSESHOES.

Specification forming part of Letters Patent No. 176,834, dated May 2, 1876; Reissue No. 8,932, dated October 14, 1879; application filed September 4, 1879.

*To all whom it may concern:*

Be it known that I, CHARLES JOHN CARR, formerly of Manchester, but at present of Matlock Green, in the county of Derby, in the Kingdom of Great Britain, engineer, have invented new and useful Improvements in Shoes for Horses and other Animals; and I do hereby declare that the following is a full and exact description thereof, reference being had to the accompanying drawings, and to the letters of reference marked thereon.

This invention consists in providing a horseshoe with an improved wearing-pad composed of compressed rope, the invention being more fully hereinafter described.

Figures 1, 2, and 3 represent the foot-surface of shoes of various shapes; Figs. 4, 5, 6, 7, and 8, the road-surface. Figs. $3^A$ and $5^A$ are sections at the lines *x x*, Figs. 3 and 5, respectively, and in all the figures similar letters refer to similar parts.

The upper or foot surface of my shoe is formed with a bead or ridge, *a*, Figs. 1, 2, and 3, of any convenient form or direction—by preference angular—and rising from the face of the shoe one-eighth of an inch, more or less, and extending round or partially round the circumference of the shoe, the greatest distance from its outer edge being about half an inch. The projecting ridge may also be round the outer circumference of the shoe, beyond the nail-holes, so that when this projecting bead or ridge is burned onto or otherwise properly let into the horse's hoof there shall be no tendency of the shoe to slide on the foot when traveling on the road; or small spikes can be cast or secured on the foot-surface of the rim of the shoe, and placed diagonally or otherwise, so that they will enter the crust upon shoeing the horse, thus rendering clips unnecessary, and greatly diminishing the number of nails required, and when the shoe is burned to the foot the same size of shoe without the pad is used for such burning purposes, and the shoe with the pad is afterward applied and secured; but I prefer cold fitting, in which case adhesive substances or mixtures may be used between the shoe and the crust of the hoof to insure more solid fitting; or a bevel may be cast on the shoe beyond the nail-holes inclining upward toward the sole of the foot, (see Fig. $3^A$,) or this bevel may commence from the extreme outer edge of the shoe, the hoof being fitted to the same; or the horn of the hoof could be hollowed out to receive a corresponding projection on the shoe, or vice versa; or cells or hollows may be formed at certain distances around the shoe, these arrangements preventing the shoe sliding on the foot; and shoes thus formed can be made of malleable cast-iron or wrought-iron, or other suitable material, whether fastened to the hoof by ordinary horse-nails or by any other means.

In the various figures, *b* represents the shield, which covers, or may partially cover, the sole, with the exception of the frog, it being varied in extent and form to meet circumstances and the structure of the hoof, but when a bar shoe is used the shield may also cover the frog.

The road or wearing surface I make as follows: In the direction of the opening of the sole-plate or shield, or at any required distance therefrom, an upright flange, *c*, is raised, corresponding, or nearly so, with the height of external rim, *d*, of the shoe. This flange may be ∩-shaped, or of any other suitable form, and extend around the space for the frog from heel to heel of the shoe, or nearly so.

The cavity formed by the thin shield *b*, flange *c*, and external rim, *d*, is adapted for the reception of pads, *e*, of greatly-compressed tarred rope, and secured by being pressed or driven onto small spikes *f*, cast to and projecting from the lower surface of the shield in said cavity; or the pads may be held by adhesive mixtures, or by other means.

The pads are made to fill the cavity between the inside of the external rim, *d*, and flange *c*, and may be combined with toe-pieces, heel-pieces, or side pieces, *g*, (see Figs. 5 and $5^A$,) of hard anti-wearing substance, in which case the shoe would last longer; or the shoe may be made thicker at these parts.

To better and more clearly explain this portion of my invention, I refer to Fig. $5^A$ of the drawings, in which a pad, *e*, of tarred rope is shown pressed into the cavity between the flanges *c* and *d*, a portion of said pad being cut away to show the internal ∧-shaped flange and spikes *f*, as hereinbefore described, and also nail-holes *h*.

It is understood that the use of the pad not only relieves the foot of the horse from most of the shock or jar experienced when traveling on hard roads, but also prevents slipping upon icy or slippery paving substances. The external rims, *d*, of the shoes may be made in a series of corrugations or angles, with nail-holes *h* in the recesses, as shown in Figs. 5 and 7; or the rims may be formed as in Fig. 4, or may be like the hand-made fullered or stamped shoe shown at Fig. 6.

In Fig. 8 the pad is shown to cover the nail-holes, so that the nails *i* will pass through the pad and find their seats within a groove formed upon the shield for this purpose, thus giving an increase of pad-surface.

Any of these shoes with shields may be used without pads; or the shields may be dispensed with, leaving simply the outer rim carrying the nail-holes, either of which arrangements may be used in combination with my improvement for preventing the shoe sliding on the foot.

Although my improved pad is shown as applied to shoes for horses and other animals with similar hoofs, (such as mules,) it will be readily understood that they can be adapted to shoes for other animals, (such as oxen;) but in this case the shoes would be made in halves.

I do not claim the manner in which the horseshoe is constructed, aside from the pad shown, to be novel, as I am aware that substantially the same construction has been used before; but I do claim and desire to secure by Letters Patent—

In a horseshoe, a pad composed of compressed rope, substantially as and for the purposes set forth.

CHARLES JOHN CARR.

Witnesses:

A. P. JONES,
14 *Southampton Buildings, Chancery Lane, London.*

CHAS. BERKLEY HARRIS,
17 *Gracechurch Street, London.*